(12) United States Patent
Kleibl et al.

(10) Patent No.: US 8,371,753 B2
(45) Date of Patent: Feb. 12, 2013

(54) COMPENSATION OF ROTATIONAL SHAFT INCLINATION

(75) Inventors: Albrecht Kleibl, Grosshennersdorf (DE); Christian Heichel, Niedernberg (DE)

(73) Assignee: ABI Anlagentechnik— Baumaschinen— Industriebedarf Maschinenfabrik und Vertriebsgesellschaft mbH, Niedernberg (DE)

( * ) Notice: Subject to any disclaimer, the term of this patent is extended or adjusted under 35 U.S.C. 154(b) by 563 days.

(21) Appl. No.: 12/596,812

(22) PCT Filed: Apr. 16, 2008

(86) PCT No.: PCT/EP2008/003037
§ 371 (c)(1),
(2), (4) Date: Dec. 29, 2009

(87) PCT Pub. No.: WO2008/128692
PCT Pub. Date: Oct. 30, 2008

(65) Prior Publication Data
US 2010/0150485 A1 Jun. 17, 2010

(30) Foreign Application Priority Data
Apr. 20, 2007 (DE) .......... 10 2007 018 795

(51) Int. Cl.
*F16C 21/00* (2006.01)
*F16C 23/00* (2006.01)
(52) U.S. Cl. .......... 384/192; 384/206; 384/295

(58) Field of Classification Search .......... 384/192, 384/195, 206, 245, 316, 322, 371, 129, 275–276, 384/282, 297
See application file for complete search history.

(56) References Cited

U.S. PATENT DOCUMENTS

| | | | |
|---|---|---|---|
| 767,360 A | 8/1904 | Stephenson | |
| 1,745,871 A | 2/1930 | Spillmann | |
| 1,982,114 A | 9/1933 | Scheffler | |
| 3,155,438 A | 11/1964 | Ruegg | |
| 3,542,441 A | 11/1970 | Nixon | |
| 3,746,328 A | 7/1973 | Martt | |
| 4,037,887 A | 7/1977 | Germain | |
| 4,080,014 A | 3/1978 | Riegler et al. | |
| 4,095,856 A * | 6/1978 | Markovitz | 384/206 |
| 4,204,412 A * | 5/1980 | Carriere | 464/141 |
| 4,815,328 A * | 3/1989 | Bodine | 74/87 |
| 5,048,646 A * | 9/1991 | Carlsson | 188/4 B |
| 5,346,316 A * | 9/1994 | Okada et al. | 384/297 |
| 5,613,914 A * | 3/1997 | Gleasman et al. | 464/159 |
| 5,716,143 A * | 2/1998 | Browne et al. | 384/192 |
| 5,730,693 A * | 3/1998 | Krayenhagen | 492/16 |
| 6,482,141 B1 | 11/2002 | Munsche | |
| 7,114,434 B2 * | 10/2006 | Kanai | 92/12.2 |
| 7,223,019 B2 * | 5/2007 | Hoppe | 384/192 |
| 2007/0053751 A1 | 3/2007 | Heichel et al. | |

FOREIGN PATENT DOCUMENTS

| | | |
|---|---|---|
| AT | 347984 B | 1/1979 |
| DE | 628105 A | 3/1936 |

(Continued)

*Primary Examiner* — Marcus Charles
(74) *Attorney, Agent, or Firm* — Collard & Roe, P.C.

(57) ABSTRACT

Bearing arrangement for a shaft rotatable around an axis of rotation comprising a first bearing for rotatably mounting an end of the shaft for rotation thereof around the axis of rotation, and a second bearing for pivotably mounting the end of the shaft for pivoting movements out of the axis of rotation, and an arrangement comprising a shaft, as well as an oscillator, each comprising the bearing arrangement.

24 Claims, 2 Drawing Sheets

FOREIGN PATENT DOCUMENTS

| | | |
|---|---|---|
| DE | 1915310 A | 8/1970 |
| DE | 2243792 A | 4/1973 |
| DE | 2621318 A1 | 11/1976 |
| DE | 10139969 A1 | 2/2003 |
| FR | 806881 | 12/1936 |
| WO | 2005075749 A1 | 8/2005 |

* cited by examiner

COMPENSATION OF ROTATIONAL SHAFT INCLINATION

Cross-Reference to Related Applications

This application is a U.S. national stage filing of International Patent Application No. PCT/EP2008/003037 filed on Apr. 16, 2008, which claims priority under the Paris Convention to German Patent Application No. 10 2007 018 795.7, filed on Apr. 20 2007.

FIELD OF THE INVENTION

The present invention relates, in general, to means for mounting rotatable shafts and, in particular, to bearing arrangements for compensating rotational shaft deformation or shaft deflection occurring in rotating shafts.

BACKGROUND OF THE INVENTION

In rotatable and, in particular, rotary driven shafts, deformations and, in particular, shaft deflections may occur during operation (i.e. when rotating the shaft), if there are forces not acting in parallel with (e.g. perpendicular to or at an angle to) the longitudinal axis of the shaft.

The following cases may be distinguished, namely cases in which the direction of forces not acting in parallel with the longitudinal axis of the shaft remains substantially the same, and cases in which the direction of forces not acting in parallel with the longitudinal axis of the shaft changes and, in particular, rotational radial forces occur.

In the first case, a substantially stationary shaft deformation or shaft deflection occurs. This may be referred to as rotational deformation or rotational deflection (or bending).

In the second case, a shaft deformation or shaft deflection occurs, the characteristic or direction of which changes as a function of the change in direction of the underlying forces. This is the case, in particular, with rotational radial forces. This may then be referred to—following the term "rotational radial forces"—as rotational shaft deformation or shaft deflection.

Examples of the first case include paper machines and rope winches, wherein the direction of forces not acting in parallel with the longitudinal axis of the shaft does not change (e.g. forces due to cooperating paper rollers arranged on shafts; forces acting on a rope arranged on a rope winch).

Examples of the second case include oscillators and vibrators, wherein unbalanced masses are provided on shafts which are rotated together with the shaft thereby generating rotational radially acting forces with respect to the longitudinal axis of the shaft or axis of rotation.

For compensation of rotational deformation or rotational deflection (or bending) in the first case, it is known, for example, to provide the radially outward part of a shaft bearing (e.g. an outer roller bearing ring) with a hinge bearing providing a hinged connection, for example, to a housing. However, such approaches are not suitable or only suitable to a limited degree for providing for compensation in the second case (rotational shaft deformation or shaft deflection).

OBJECT OF THE INVENTION

It is the object of the present invention to provide solutions for compensating rotational shaft deformations or shaft deflections occurring in rotatable shafts.

SUMMARY

The present invention provides a bearing arrangement and an arrangement comprising the bearing arrangement and a shaft.

The bearing arrangement according to the invention is intended for a shaft rotatable around an axis of rotation and comprises a first bearing for rotatably mounting an end of the shaft for rotation thereof around the axis of rotation and a second bearing for pivotably mounting the end of the shaft for pivoting movements out of the axis of rotation.

In this connection, the first bearing may be adapted for coupling to the end of the shaft and the second bearing may be adapted for coupling to a mounting structure.

The term "coupling" and wordings comparable thereto, such as "coupled", encompass that two components are immediately and directly connected to each other, for example, by means of one or a plurality of screw, clamp, adhesive, welded connections and/or positive and/or non-positive connections. However, the term "coupling" and wordings comparable thereto, such as "coupled", also encompass that two components are indirectly connected to each other, for example, by means of an intermediate connecting element and/or structure.

In comparison thereto, the term "connection" and wordings comparable thereto, such as "connected", are supposed to indicate that two components are immediately and directly connected to each other, e.g. as explained above by way of example.

Alternatively, the second bearing may be adapted for coupling to the end of the shaft and the first bearing may be adapted for coupling to a mounting structure.

Preferably, the first bearing is a plain bearing and the second bearing is a hinge or pivot bearing or vice versa.

In preferred embodiments, the first bearing comprises an inner bearing part and an outer bearing part and the second bearing comprises an inner bearing part and an outer bearing part.

The terms "inner" and "outer" used for the bearing parts have been chosen for indicating that an inner bearing part is arranged at a lesser distance from the axis of rotation in the radial direction with respect to the axis of rotation than the corresponding outer bearing part.

The inner bearing part of the first bearing may be coupled to the outer bearing part of the second bearing.

Alternatively, the inner bearing part of the first bearing and the outer bearing part of the second bearing may be formed integrally.

The inner bearing part of the first bearing preferably comprises a hollow-cylindrical region having, at an inner surface, a mounting surface extending substantially in parallel with the axis of rotation for connection with the outer bearing part of the second bearing.

The inner bearing part of the first bearing may further comprise, at an outer circumferential surface, a bearing surface extending substantially in parallel with the axis of rotation for operative connection with the outer bearing part of the first bearing.

The inner bearing part of the first bearing may (also) comprise a region serving as a stop for the outer bearing part of the second bearing in a direction substantially in parallel with the axis of rotation.

The inner bearing part of the first bearing preferably (further) comprises a bearing surface extending substantially perpendicular to the axis of rotation for operative connection with the outer bearing part of the first bearing.

A recess for receiving a lubricant may be formed in the inner bearing part of the first bearing.

In preferred embodiments, the outer bearing part of the first bearing may comprise a mounting region which is adapted for fastening the first bearing to a mounting structure.

In such embodiments, the inner bearing part of the second bearing may be adapted for torsion-resistant operative connection with the end of the shaft or a bearing receiving means for the second bearing may be provided, which bearing receiving means is adapted for torsion-resistant operative connection with the end of the shaft.

In further preferred embodiments, the inner bearing part of the second bearing may comprise a mounting region which is adapted for fastening the second bearing to a mounting structure.

In such embodiments, the outer bearing part of the first bearing may be adapted for torsion-resistant operative connection with the end of the shaft or a bearing receiving means for the first bearing may be provided, which bearing receiving means is adapted for torsion-resistant operative connection with the end of the shaft.

The outer bearing part of the first bearing preferably comprises a bearing surface extending substantially in parallel with the axis of rotation for operative connection with the inner bearing part of the first bearing.

The outer bearing part of the first bearing may further comprise a bearing surface extending substantially perpendicular to the axis of rotation for operative connection with the inner bearing part of the first bearing.

In preferred embodiments, the inner bearing part of the second bearing may be coupled to the outer bearing part of the first bearing.

In further preferred embodiments, the inner bearing part of the first bearing and the outer bearing part of the first bearing may be formed integrally.

The outer bearing part of the first bearing preferably comprises a bearing surface extending substantially in parallel with the axis of rotation for operative connection with the inner bearing part of the first bearing.

In preferred embodiments, the inner bearing part of the first bearing may comprise a mounting flange which is adapted for fastening the first bearing to a mounting structure.

In such embodiments, the outer bearing part of the second bearing may be adapted for torsion-resistant operative connection with the end of the shaft or a bearing receiving means for the second bearing may be provided, which bearing receiving means is adapted for torsion-resistant operative connection with the end of the shaft.

In further preferred embodiments, the outer bearing part of the second bearing may comprise a mounting flange which is adapted for fastening the second bearing to a mounting structure.

In such embodiments, the inner bearing part of the first bearing may be adapted for torsion-resistant operative connection with the end of the shaft or a bearing receiving means for the first bearing may be provided, which bearing receiving means is adapted for torsion-resistant operative connection with the end of the shaft.

The inner bearing part of the first bearing preferably comprises at least one bore for supply of lubricant.

Furthermore, the present invention provides an arrangement which comprises a shaft having an end and a bearing arrangement according to the invention, wherein the end of the shaft and the first or second bearing are coupled to each other in a torsion-resistant manner.

In the arrangement according to the invention, the end of the shaft may be coupled to the inner bearing part of the first bearing or to the inner bearing part of the second bearing or to the outer bearing part of the first bearing or to the outer bearing part of the second bearing.

In the arrangement according to the invention, the end of the shaft may further be connected directly to the first or the second bearing. Alternatively, the end of the shaft may be connected to the first or the second bearing by means of the bearing receiving means.

In the arrangement according to the invention, preferably at least one bore and/or at least one conduit for supply of lubricant is provided in the end of the shaft.

Furthermore, the present invention provides an oscillator comprising the arrangement according to the invention, wherein at least one unbalanced mass may be provided which may be rotated by means of the shaft.

BRIEF DESCRIPTION OF THE DRAWINGS

In the following, preferred embodiments of the present invention are described with reference to the attached drawings, in which.

DESCRIPTION OF PREFERRED EMBODIMENTS

Figure 1:
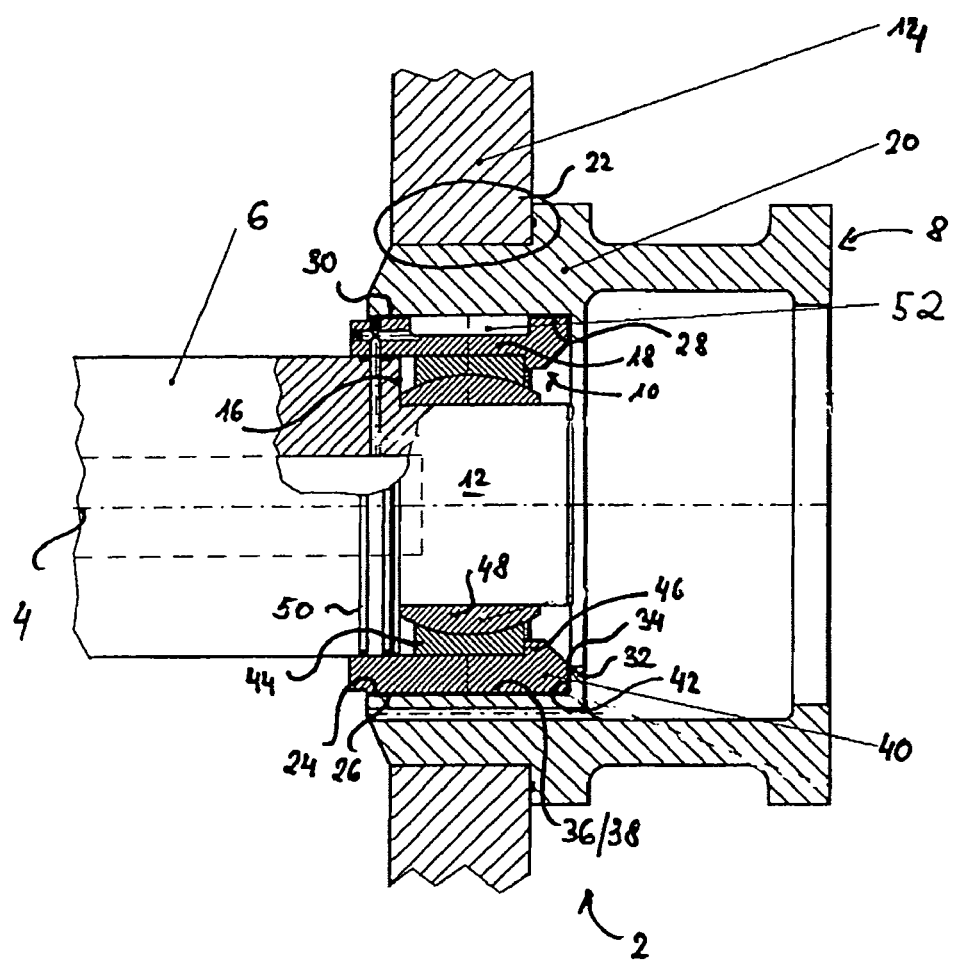
FIG. 1 shows a schematic sectional view of an embodiment of the present invention.
Figure 2:
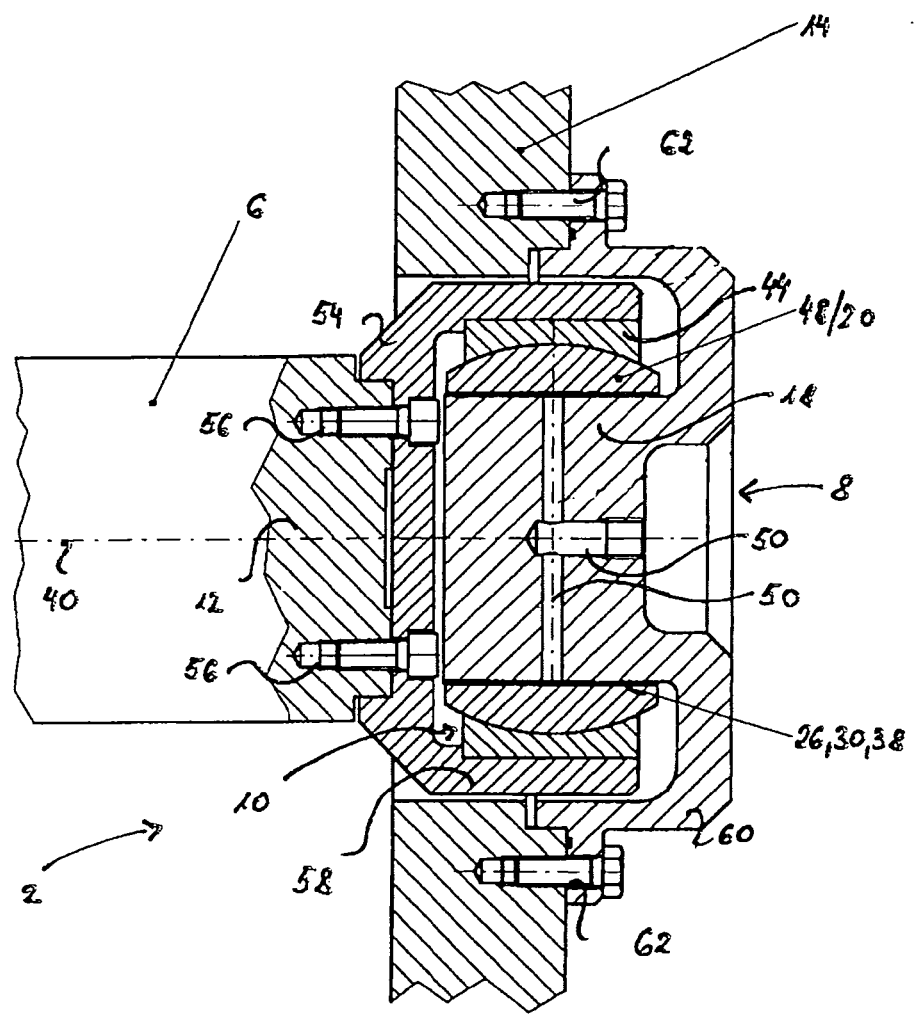
FIG. 2 shows a schematic sectional view of a further embodiment of the present invention.

FIGS. 1 and 2 show preferred embodiments of the present invention which are used, for example, in an oscillator or vibrator or which may be a component thereof. An example of an oscillator or vibrator is described, for example, in WO 2005/075749 A1. In the following, it is referred to an application of the present invention in an oscillator for the sake of illustration; however, as already explained above, application of the present invention is not limited to devices of this kind, rather it is contemplated wherever rotational shaft deformations and/or shaft deflections are to be compensated.

Oscillators and vibrators generate oscillations and/or vibrations by means of one or a plurality of unbalanced masses arranged on one or a plurality of shafts, which oscillations and/or vibrations are transmitted, for example, to piling material (e.g. piles, beams etc.) to be inserted into the soil.

By rotation of the unbalanced mass(es), forces, in particular, centrifugal forces, acting on the bearings of the shaft(s) occur. Moreover, the bearings are subject to high rotational speeds. Since the allowable speed of bearings, in particular, roller bearings, decreases with increasing load rating, the load limits of customary bearings (e.g. roller bearings) are restrictive. The use of plain bearings, as described e.g. in WO 2005/075749 A1, constitutes an improvement over roller bearings.

As explained at the beginning, the shaft of an oscillator is deformed (deflected) during operation due to forces generated by rotation of one or a plurality of unbalanced masses. The deformation/deflection of the shaft may cause the mounted shaft ends to become wedged in their bearings and may cause edge pressure in the bearings (e.g. plain bearings). This may happen, in particular, with increasing rotational speed and/or a greater unbalance mass, since the deformation or is deflection then increases as well. The risk of edge pressure in the bearing increases if—as is common practice—greater bearing widths are used for avoiding (high) bearing friction.

Wedging of the shaft ends in their bearings could be limited, in theory, by increasing the bearing clearance and/or using smaller bearing widths. However, a greater bearing clearance may entail the occurrence of an increased surface pressure in the bearing and a jamming of the bearing. A narrow bearing must be designed with a greater diameter for not exceeding the maximum allowable surface pressure in the bearing, which may, inter alia, result in a greater bearing clearance having the said disadvantages. Such approaches are thus inadequate.

According to the invention, this problem is solved by compensating rotational shaft deformations and/or shaft deflections occurring in rotatable shafts by means of a bearing arrangement provided for mounting a shaft end which, on the one hand, provides for mounting with respect to the rotation of the shaft around the axis of rotation and, on the other hand, provides for—apart from the afore-mentioned mounting—a hinged or pivotable mounting with respect to movements of the shaft end not in parallel with the axis of rotation. The hinged or pivotable mounting has the effect that wedging of the shaft end in the bearing arrangement is avoided or at least reduced to an acceptable degree.

FIG. 1 shows an embodiment of a bearing arrangement 2 according to the invention which is provided for mounting a shaft 6 rotatable around an axis of rotation 4.

The bearing arrangement 2 comprises a first bearing 8 and a second bearing 10. The first bearing 8 has the form of a plain bearing, whereas the second bearing 10 has the form of a hinge or pivot bearing.

According to the illustration, the first bearing 8 is adapted for connection to a mounting structure 14 and the second bearing 10 is adapted for connection to an end 12 of the shaft 6. For example, a housing of the shaft-bearing arrangement or a part thereof may serve as the mounting structure 14.

As illustrated in FIG. 1, the end 12 of the shaft 6 may have a reduced diameter in the region of the second bearing 10 as compared to the shaft region located farther to the left in FIG. 1. This change in cross-section may be achieved, as shown in FIG. 1, by means of a shoulder 16 extending perpendicular to the axis of rotation 4 or by means of a linear or curved transition area. The shoulder or transition area then provides a stop for the second bearing 10 and may thus improve the coupling of shaft 6 and second bearing 10, in particular, against displacement in the direction in parallel with axis of rotation 4. The configuration with a reduced diameter in the region of the second bearing 10 further enables a design reduced in size at least as compared to embodiments without a change in shaft diameter.

The first bearing 8 comprises an inner bearing part 18 and an outer bearing part 20. The outer bearing part 20 has the form of a bearing bush and comprises a mounting region 22, by means of which the first bearing may be secured to the mounting structure 14. The mounting region 22 is preferably stepped in order to provide for an improved locking to the mounting structure 14.

The outer bearing part 20 further comprises a bearing surface 24 extending substantially in parallel with the axis of rotation 4, which bearing surface is coated, at least in part, with a friction-reducing material or plain bearing material 26 and/or is composed, at least in part, of such a material.

The bearing surface 24 is provided for operative connection with the inner bearing part 18, in particular, with a bearing surface 28 thereof. The bearing surface 28 may also be coated, at least in part, with a friction-reducing material or plain bearing material 30 and/or may be composed, at least in part, of such a material.

Moreover, the outer bearing part 20 may comprise an annular shoulder 32 extending radially inwards which is capable of avoiding displacement of the inner bearing part 18 in the direction in parallel with the axis of rotation 4. The shoulder 32 may comprise, at least in part, a friction-reducing material or plain bearing material 34 and/or may be composed, at least in part, of such a material, at is front face extending in the radial direction and facing the inner bearing part 18.

The inner bearing part 18, at its outer circumferential surface 36, is adapted for operative connection with the bearing surface 24 of the outer bearing part 20. For this purpose, a friction-reducing material or plain bearing material 38 may be provided as a coating, at least in part, at the outer circumference 36 and/or as a material forming the outer circumference. At its end 40 opposite to the front face of the shoulder 32, the inner bearing part 18 preferably also comprises, at least in part, a friction-reducing material or plain bearing material 42 and/or is composed, at least in part, of such a material.

According to the illustration, the first bearing 8 and the second bearing 10 are realized as separate components. In particular, according to FIG. 1, the inner bearing part 18 of the first bearing 8 and an outer bearing part 44 of the second bearing 10 are realized separately and connected to each other for forming the bearing arrangement, for example, by means of a clamp, adhesive, welded connection and/or positive and/or non-positive connection. For improving the connection between the inner bearing part 18 and the outer bearing part 44 and, in particular, for avoiding displacement of the of the inner bearing part 18 and the outer bearing part 44 in relation to each other in the direction in parallel with the axis of rotation 4, the inner bearing part 18 may comprise a shoulder 46 extending radially inwards. The shoulder 46 serves as a stop for the outer bearing part 44 and may also be used for positioning the bearing parts 18 and 44 in relation to each other. Alternatively, the bearing parts 18 and 44 may be formed integrally.

The second bearing 10 further comprises an inner bearing part 48 which is capable of cooperating with an analogously shaped (e.g. complementary) bearing surface (no reference numeral) of the outer bearing part 44 via a curved bearing surface (no reference numeral). Also in this case, a friction-reducing material or plain bearing material may be provided as a coating, at least in part, on one or both bearing parts 44 and 48 and/or may be provided, at least in part, for forming the bearing parts 44 and 48.

The inner bearing part 48 is coupled to the end 12 of the shaft 6 in a torsion-resistant manner. This may be achieved, as illustrated in FIG. 1, by means of a connection of the shaft end 12 and the inner bearing part 18, for example, in form of a clamp, adhesive, welded connection and/or positive and/or non-positive connection. Alternatively, the coupling may be achieved by arranging a connecting structure (not shown) between the shaft end 12 and the inner bearing part 48. For example, a means may be used as the connecting structure which is comparable, at least with regard to its coupling function, to a bearing receiving means explained with reference to FIG. 2.

The first bearing 8 and/or the second bearing 10 may be supplied with a lubricant via one or a plurality of conduits and/or bores 50 in the shaft 6 which may be supplied with a lubricant, for example, via a central rotary feedthrough (not shown) formed in the shaft 6. Furthermore, a recess 52 serving as an "oil pocket" may be provided, for example, in the inner bearing part 18 of the first bearing 8, in which a lubricant may be (temporarily) stored and which may serve as a load-free zone for supply of lubricant.

Moreover, embodiments not shown here are contemplated which are comparable to the above-described embodiments in so far as the inner bearing part 18 of the first bearing 8 and the outer bearing part 44 of the second bearing 10 are also coupled to each other or formed integrally. However, in the embodiments not shown here, "reverse" arrangements of the first and second bearings 8 and 10 in relation to the shaft 6 and the mounting structure 14 are contemplated, in which the first bearing 8 is connected to the shaft 6 or is coupled to the shaft 6 via a bearing receiving means arranged between the shaft 6 and the first bearing 8, whereas the second bearing 10 is secured to a mounting structure.

The mode of operation of the embodiments described with reference to FIG. 1 is as follows:

Rotational movements of the shaft 6 are accommodated and supported by the first bearing 8. If rotational shaft deformations and/or shaft deflections occur upon rotation of the shaft 6 and rotational inclinations of the shaft end 12 arise as a result thereof, one or a plurality of pivoting movements or pivoted positions resulting therefrom are accommodated and compensated rotationally by the second bearing 10, i.e. a displacement of the inner and outer bearing parts 44 and 48 of the second bearing 10 resulting from a pivoted position of the shaft end 12 with respect to the axis of rotation 4 rotates with the rotating shaft 6 at shaft speed.

FIG. 2 shows a further embodiment of a bearing arrangement 2 according to the invention which is provided for mounting a shaft 6 rotatable around an axis of rotation 4.

The bearing arrangement 2 comprises a first bearing 8 and a second bearing 10. The first bearing 8 has the form of a plain bearing, whereas the second bearing 10 has the form of a hinge or pivot bearing.

According to the illustration, the first bearing 8 is adapted for connection to a mounting structure 14, whereas the second bearing 10 is adapted for coupling to an end 12 of the shaft 6 here. For example, a housing of the shaft-bearing arrangement or a part thereof may serve as the mounting structure 14.

A bearing receiving means 54 is attached to the end 12 of the shaft 6, for example, by means of screw connections 56. The bearing receiving means 54 comprises a hollow-cylindrical region 58 extending in parallel with the axis of rotation 4, to which the second bearing 10, more specifically an outer bearing part 44 thereof, is fastened, for example by means of a clamp, adhesive, welded connection and/or positive and/or non-positive connection.

The second bearing 10 further comprises an inner bearing part 48 which is capable of cooperating with an analogously shaped (e.g. complementary) bearing surface (no reference numeral) of the outer bearing part 44 via a curved bearing surface (no reference numeral). Also in this case, a friction-reducing material or plain bearing material may be provided as a coating on one or both bearing parts 44 and 48 and/or may be provided, at least in part, for forming the bearing parts 44 and 48.

According to the illustration, the inner bearing part 48 of the second bearing 10 and an outer bearing part 20 of the first bearing 8 are formed integrally. Thus, reference numerals 48 and 20 refer to the same component.

Alternatively, the inner bearing part 48 of the second bearing 10 and the outer bearing part 20 of the first bearing 8 may be realized as separate components and may be connected to each other for forming the bearing arrangement, for example, by means of a clamp, adhesive, welded connection and/or positive and/or non-positive connection. In such embodiments, the outer bearing part 20 may—as explained above with reference to FIG. 1 with regard to the inner bearing part 18 of the first bearing 8 and the outer bearing part 44 of the second bearing 10—comprise a shoulder extending radially inwards for improving the connection between the inner bearing part 48 and the outer bearing part 20 and, in particular, for avoiding displacement of the of the inner bearing part 48 and the outer bearing part 20 in relation to each other in a direction in parallel with the axis of rotation 4.

The first bearing 8 further comprises a region acting as an inner bearing part 18 and comprising a bearing surface 28. The outer bearing part 20 comprises a bearing surface 24 extending substantially in parallel with the axis of rotation 4, which bearing surface is coated, at least in part, with a friction-reducing material or plain bearing material 26 and/or is composed, at least in part, of such a material.

The bearing surface 24 is provided for operative connection with the inner bearing part 18, in particular, with the bearing surface 28 thereof. The bearing surface 28 may also be coated, at least in part, with a friction-reducing material or plain bearing material 30 and/or may be composed, at least in part, of such a material.

Furthermore, a cap-like flange 60 is formed on the first bearing 8 which is provided for connection to the mounting structure 14, for example, via screw connections 62.

The first bearing 8 and/or the second bearing 10 may be supplied with a lubricant via one or a plurality of conduits and/or bores 50 in the first bearing 8, more specifically the inner bearing part 18 thereof, which may be supplied with a lubricant, for example, via a central rotary feedthrough (not shown) formed in the inner bearing part 18.

Moreover, embodiments not shown here are contemplated which are comparable to the above-described embodiments in so far as the outer bearing part 20 of the first bearing 8 and the inner bearing part 48 of the second bearing 10 are also coupled to each other or formed integrally. However, in the embodiments not shown here, "reverse" arrangements of the first and second bearings 8 and 10 in relation to the shaft 6 and the mounting structure 14 are contemplated, in which the first bearing 8 is connected to the shaft 6 or is coupled to the shaft 6 via a bearing receiving means arranged between the shaft 6 and the first bearing 8, whereas the second bearing 10 is secured to a mounting structure.

The mode of operation of the embodiments described with reference to FIG. 2 is as follows:

Rotational movements of the shaft 6 are accommodated and supported by the first bearing 8. If rotational shaft deformations and/or shaft deflections occur upon rotation of the shaft 6 and rotational inclinations of the shaft end 12 arise as a result thereof, one or a plurality of pivoting movements or pivoted positions resulting therefrom are accommodated and compensated rotationally by the second bearing 10, i.e. a displacement of the inner and outer bearing parts 44 and 48 of the second bearing 10 resulting from a pivoted position of the shaft end 12 with respect to the axis of rotation 4 rotates with the rotating shaft 6 at shaft speed.

The invention claimed is:

1. A bearing arrangement for a shaft rotatable around an axis of rotation, comprising:
   a plain bearing for rotatably mounting an end of the shaft for rotation thereof around the axis of rotation;
   and a hinge or pivot bearing for pivotably mounting the end of the shaft for pivoting movements out of the axis of rotation,
   wherein the hinge or pivot bearing is arranged in the flow of forces between the shaft and the plain bearing.

2. The bearing arrangement according to claim 1, wherein the hinge or pivot bearing is adapted for coupling to the end of the shaft and the plain bearing is adapted for coupling to a mounting structure.

3. The bearing arrangement according to claim 2, wherein the inner bearing part of the plain bearing comprises at least one bore and/or at least one conduit for supply of lubricant.

4. The bearing arrangement according to claim 1, wherein the plain bearing comprises an inner bearing part and an outer bearing part and the hinge or pivot bearing comprises an inner bearing part and an outer bearing part.

5. The bearing arrangement according to claim 4, wherein the inner bearing part of the plain bearing is coupled to the outer bearing part of the hinge or pivot bearing.

6. The bearing arrangement according to claim 5, wherein the inner bearing part of the plain bearing and the outer bearing part of the hinge or pivot bearing are formed integrally.

7. The bearing arrangement according to claim 5, wherein the inner bearing part of the plain bearing comprises a hollow-cylindrical region having, at an inner surface, a mounting surface extending substantially in parallel with the axis of rotation for connection with the outer bearing part of the hinge or pivot bearing.

8. The bearing arrangement according to claim 4, wherein the inner bearing part of the plain bearing comprises, at an outer circumferential surface, a bearing surface extending substantially in parallel with the axis of rotation for operative connection with the outer bearing part of the plain bearing.

9. The bearing arrangement according to claim 4, wherein the inner bearing part of the plain bearing comprises a region serving as a stop for the outer bearing part of the hinge or pivot bearing in a direction substantially in parallel with the axis of rotation.

10. The bearing arrangement according to claim 4, wherein the inner bearing part of the plain bearing comprises a bearing surface extending substantially perpendicular to the axis of rotation for operative connection with the outer bearing part of the first bearing.

11. The bearing arrangement according to claim 4, wherein a recess for receiving a lubricant is formed in the inner bearing part of the plain bearing.

12. The bearing arrangement according to claim 4, wherein the outer bearing part of the plain bearing comprises a mounting region which is adapted for fastening the plain bearing to the mounting structure.

13. The bearing arrangement according to claim 4, wherein the inner bearing part of the hinge or pivot bearing is adapted for torsion-resistant operative connection with the end of the shaft.

14. The bearing arrangement according to claim 4, wherein the outer bearing part of the plain bearing is coupled to the inner bearing part of the hinge or pivot bearing.

15. The bearing arrangement according to claim 14, wherein the outer bearing part of the plain bearing and the inner bearing part of the hinge or pivot bearing are formed integrally.

16. The bearing arrangement according to claim 4, wherein the inner bearing part of the plain bearing comprises, at an outer circumferential surface, a bearing surface extending substantially in parallel with the axis of rotation for operative connection with the outer bearing part of the plain bearing.

17. The bearing arrangement according to claim 4, further comprising a bearing receiving means for the hinge or pivot bearing, the bearing receiving means being adapted for torsion-resistant operative connection with the end of the shaft.

18. The bearing arrangement according to claim 4, wherein the inner bearing part of the plain bearing comprises a mounting region which is adapted for fastening the plain bearing to the mounting structure.

19. The bearing arrangement according to claim 4, wherein the inner bearing part of the plain bearing comprises at least one bore and/or at least one conduit for supply of lubricant.

20. An arrangement comprising:
a shaft having an end; and
a bearing arrangement according to claim 1,
wherein the end of the shaft and the hinge or pivot bearing are coupled to each other in a torsion-resistant manner.

21. The arrangement according to claim 20, wherein the hinge or pivot bearing comprises an inner bearing part and an outer bearing part and wherein the end of the shaft is coupled to the inner bearing part or to the outer bearing part of the hinge or pivot bearing.

22. The arrangement according to claim 20, wherein the hinge or pivot bearing comprises an inner bearing part adapted for torsion-resistant operative connection with the end of the shaft, and
wherein the end of the shaft is connected directly to the hinge or pivot bearing.

23. The arrangement according to claim 20, wherein the bearing arrangement further comprises a bearing receiving means for the hinge or pivot bearing, the bearing receiving means being adapted for torsion-resistant operative connection with the end of the shaft, and
wherein the end of the shaft is connected to the hinge or pivot bearing by the bearing receiving means.

24. The arrangement according to claim 20, wherein the end of the shaft comprises at least one bore and/or at least one conduit for supply of lubricant.

* * * * *

UNITED STATES PATENT AND TRADEMARK OFFICE
CERTIFICATE OF CORRECTION

PATENT NO. : 8,371,753 B2
APPLICATION NO. : 12/596812
DATED : February 12, 2013
INVENTOR(S) : Kleibl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this

First Day of September, 2015

Michelle K. Lee
*Director of the United States Patent and Trademark Office*